July 24, 1973    J. F. CAMPBELL ET AL    3,748,207
MECHANISM FOR HEAT SEALING
Filed Aug. 26, 1971
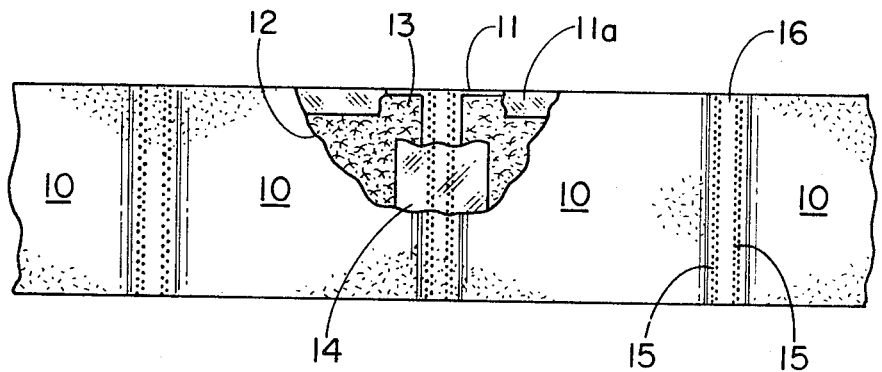
FIG. I
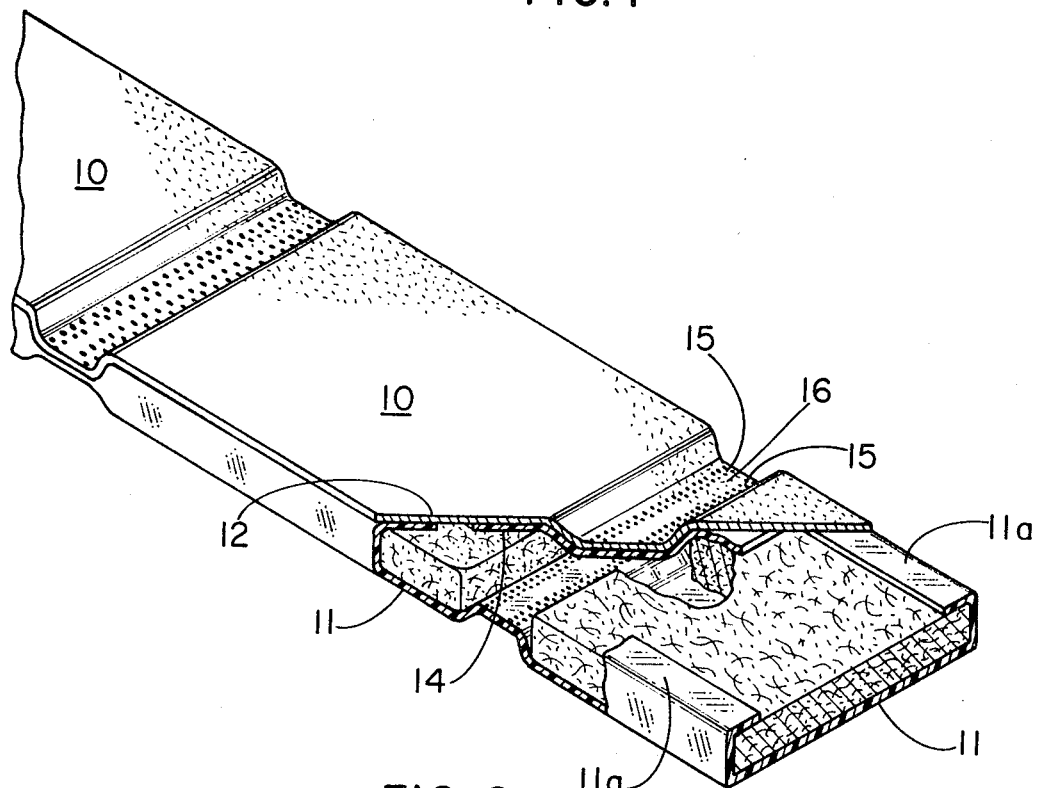
FIG. 2

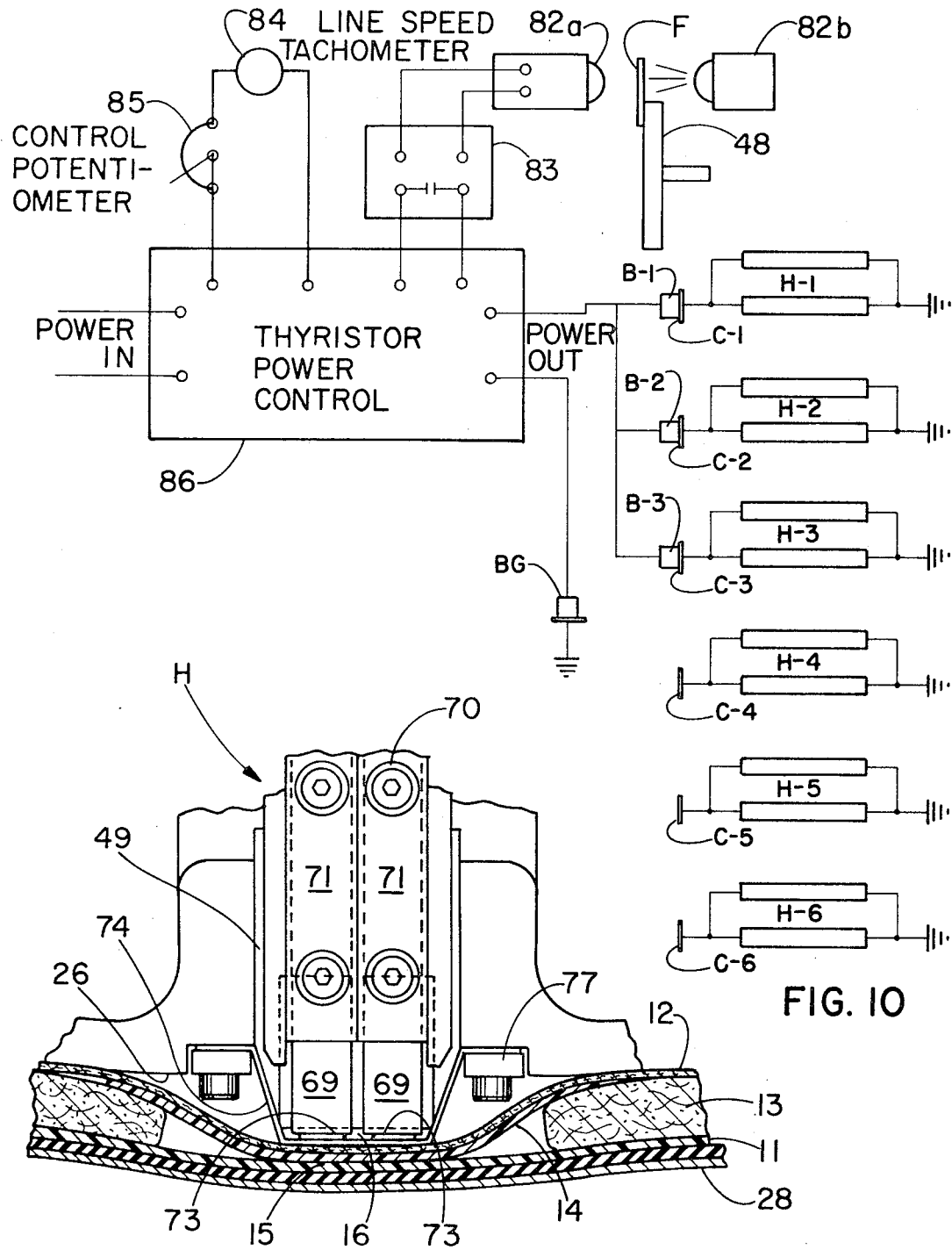

United States Patent Office 3,748,207
Patented July 24, 1973

3,748,207
MECHANISM FOR HEAT SEALING
James F. Campbell and Ernst Daniel Nystrand, Green Bay, Wis., assignors to Kimberly-Clark Corporation, Neenah, Wis.
Filed Aug. 26, 1971, Ser. No. 175,191
Int. Cl. B32b 31/00
U.S. Cl. 156—359
9 Claims

ABSTRACT OF THE DISCLOSURE

Equipment for heat sealing products having at least one thermoplastic component is described. The mechanism for heat sealing itself included means for pre-heating an electrical heating element which supports the product to be heat sealed. The electrical heating element is associated with means for controlling the duration and value of the electric heating current. The electric current is conveniently proportioned to machine speed so that products moving through the equipment at lower speed may be subjected to a less intense heating current. The sealing operation is specifically applied to diapers of the disposable type having a liquid impervious polyethylene backing, a liquid permeable reinforced paper tissue, a filling of absorbent material, and an insert of high melt index polyethylene film material to provide at diaper ends a structure in the form of a dam.

BACKGROUND OF THE INVENTION

Field of the invention

This present invention relates to the manufacture on a continuous basis of products which include at least one thermoplastic component and are heat sealed. More particularly, the invention relates to the art of heat sealing at substantial speeds and at speeds which may vary over a considerable range. Still more specifically, the invention relates to the provision of transverse seals adjacent the ends of products having relatively bulked central portions between the ends.

THE INVENTION WITH RELATION TO THE PRIOR ART

Thermoplastic sheets, as is well known, are presently widely used on a variety of products. The materials of such sheets include, for example, the polyethylenes, heat treated or corona treated polyethylenes, polymerized polyvinyl chloride and the like. Advantages of such materials are a capacity for inhibiting the transfer of moisture and heat sealing quality which provides for the attainment of fluid tight seams between sheets. The usual practice is to abut the sheets which are to be provided with the seam and to then heat the thermoplastic material in the abutted zone under pressure application until the material becomes plastic; upon cooling of the abutted zone, the material is heat sealed and substantially fluid tight and mechanically strong. In some instances paper or foil has been heat sealed to a thermoplastic to provide for strength with minimal thermoplastic film thickness or to obtain particular properties in the composite such as printability.

In production operations involving heat seal formation the speed of sealing is a major consideration. The equipment is required to plasticize the heat seal material quickly and to promptly solidify it to avoid distortion in the seal zones. Additionally, for control purposes, as in starting and stopping of the equipment, the heat seal arrangements must be flexible to provide good seals over a wide speed range and avoid loss of product. Frequently, the product itself, due to its contour, dimensions or the like is of such nature that the heat sealing mechanisms useful generally for the film lamination will not serve the purpose well. As already noted, some prior art products involve the heat sealing of thermoplastics with other materials and such becomes more difficult as speed requirements of equipment become more demanding, both as to high rate of speed and as to ability to effect sealing over a wide speed range.

It is an object of the present invention to provide a machine for heat sealing layers of material at least one of which is thermoplastic and which machine functions to preheat an electrically conductive heating element to a temperature below that of the softening of the thermoplastic material to be sealed. The sealing temperature is provided by a sealing pulse passed through the pre-heated heating element.

It is another object of the invention to provide a machine for heat sealing layers of material at least one of which is thermoplastic and wherein the value of the heating current to electrically conductive heating elements for effecting the sealing is related to machine speed.

It is a further object of the invention to provide a heat sealing machine so constructed and arranged as to accommodate a relatively bulky product and retain it while borders of the product are heat sealed.

Still another object of the invention is to provide in heat sealing mechanism means for removing a heat sealed product from the equipment on a continuous basis without significant detriment to the product or fouling of machine surfaces with thermoplastic material.

Yet another object of the present invention is to provide equipment to form a heat seal on products which contact the human body and which seal is soft, flexible and not irritating to wear.

The machine and method of the invention are described in detail hereinafter with particular reference to a diaper structure. The diaper structure is generally illustrated in Endres U.S. Pat. 3,520,303 issued July 14, 1970 and assigned to the Kimberly-Clark Corporation, Neenah, Wis. The diaper adapted to be sealed in the machine of the present invention may have other forms and the equipment is applicable to the sealing of structures other than the diaper embodiments, for example, disposable garments such as laboratory coats, aprons and the like.

DETAILED DESCRIPTION OF THE INVENTION

The invention will be more fully understood by reference to the following detailed description and accompanying drawings wherein:

FIG. 1 is a fragmentary view in plan with parts broken away illustrating a plurality of diapers sealed in accordance with the invention and in the form of a continuous length;

FIG. 2 is a view in perspective of diapers like that of FIG. 1 but somewhat enlarged and with parts broken away illustrating more particularly the seal structure of the individual diapers;

FIG. 10 is a block diagram illustrating the general nature of the control equipment useful in the operation of the mechanism of FIG. 3;

FIG. 11 is a fragmentary view in elevation with parts in section illustrating the relationship of the heat sealing equipment to the diaper structure during the heat sealing operation;

Figure 3:
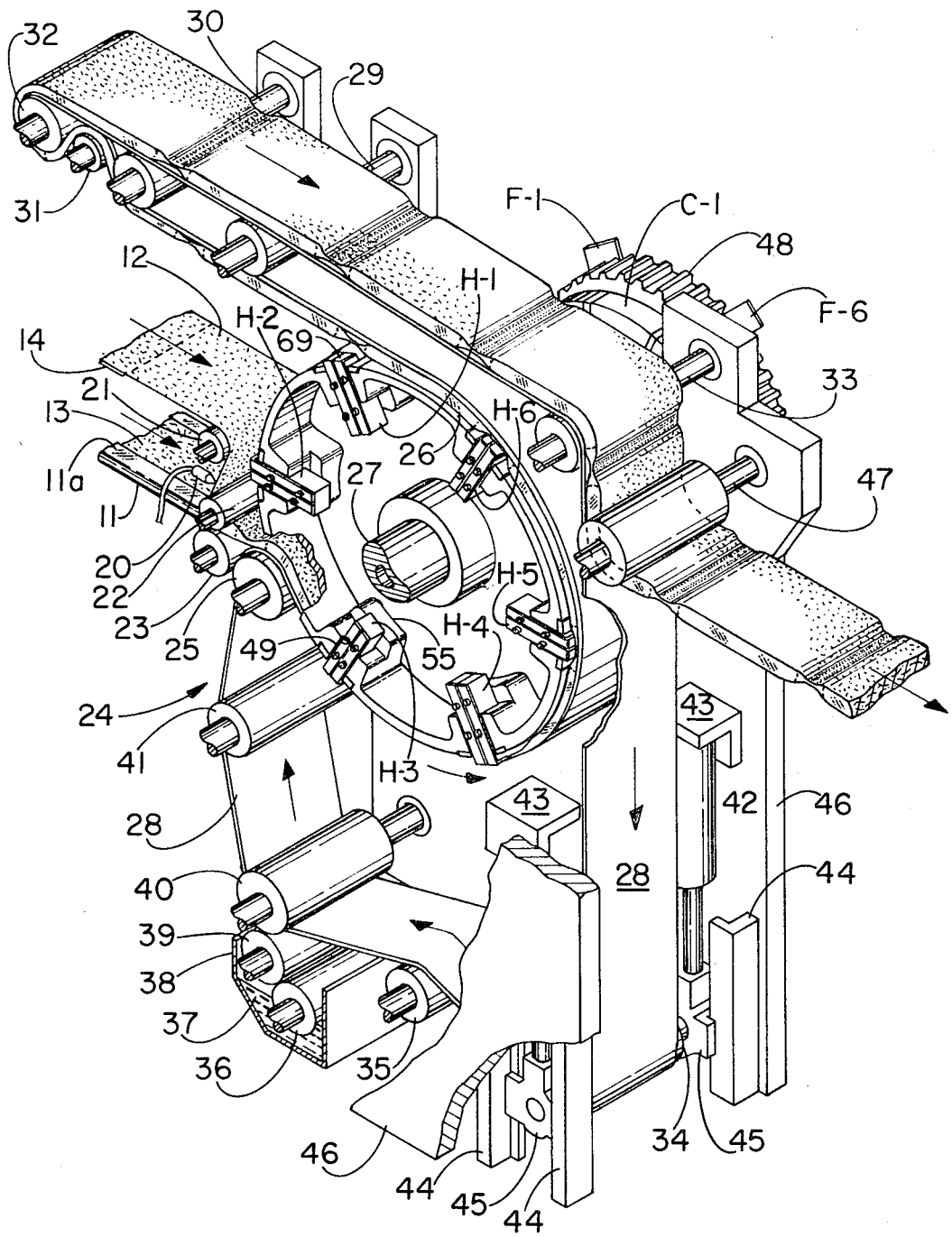
FIG. 3 is a perspective and fragmentary view with parts broken away of equipment useful in carrying out the sealing operation on diapers on a continuous basis as illustrated in FIGS. 1 and 2.

Broadly considered, in the practice of the invention, the layers of material including at least one thermoplastic material to be bonded are brought into superposed position. An electrically conductive heat sealing element suitably in the form of an elongated strip is so provided as to be in heat conducting relation with the superposed contacting materials and the heat sealing element is itself in heat conductive relation with a source of heat of substantially constant temperature. This heat source functions to pre-heat or raise the temperature of the heat sealing element and superposed materials thereon toward the heat-sealing or bonding temperature of the materials. The source serves to maintain the materials at a temperature condition at which thermal degradation is not serious to the product but which temperature is preferably also such that the heat sealing temperature is quickly reached when the heat sealing element is pulsed with electric current. In the specific embodiment described the pre-heated heat sealing element is periodically energized to about heat sealing temperature in accord with the position in the machine of the material to be sealed. Also, pressure is applied to the superposed materials during electric current heating and for a short dwell period following current energizing of the element to permit setting of the bond. Further to standardize bonding and to minimize defects, the equipment provides for control of the level of the electric current in the heat sealing element and the duration of pulse current application in accordance with machine speed and no energizing current flows to the heat sealing element when the machine is in a stopped or inoperative condition. As the machine is accelerated to relatively slow speeds, a low level of current flows to the heated heat sealing element and the heated superposed materials, the current being sufficient over the time the material is pulsed to effect sealing. As the machine speed is further increased, a higher level of current is applied to compensate for a shorter period of time of subjection to the heating current. Suitably, each bond zone is pulsed a plurality of times as it traverses the equipment for this further permits electric current to be maintained at relatively low levels and to avoid the tendency of materials to thermally degrade which may adversely affect both bond strength and bond life. The zones of the material to be bonded in continuous equipment operation are preferably spaced at equidistant intervals and signal means moving at the speed of the material or in proportion to it are arranged to control pulse initiation and termination. Conventional tachometer-generator means operated by contact with the equipment provide an output to a power amplifier in known manner to control the level of the current supplied to the heat sealing element.

Referring now more particularly to FIGS. 1 and 2 of the drawings, reference numeral 10 designates a diaper of the disposable kind. It includes a substantially liquid impervious polyethylene backing 11 having a turned portion 11a. The numeral 12 indicates a cover sheet which is adapted to lie against the skin of a wearer and is of a scrim reinforced paper tissue, the tissue lying most suitably toward the diaper interior; commonly, nylon is employed as the scrim material. The absorbent filling of the diaper is indicated at 13 and comprises plies of creped cellulosic wadding or other convenient absorbent material. The absorbent 13 may lie on the backing inwardly of the backing edge or may be co-terminous with the edge.

The illustrations of FIGS. 1 and 2 are of a plurality of diapers connnected together and heat sealed in accordance with the invention. The heat seals extend transversely of the diapers at their ends. The heat seal zones include the polyethylene backing 11, the overlying reinforced paper tissue sheet 12, and a film strip 14 which lies between the sheets 11, 12. Each film strip 14 projects also over the absorbent filling 13 of two adjacent diapers and, when the heat seal is completed (FIGS. 1 and 2), the strip 14 at its opposite longitudinal ends lies free over the fillings 13 but is sealed to the sheet 11, 12 to provide a transversely extending dam from edge to edge of the diaper. The heat seal or bond zone of each diaper is designated by the numeral 15 and, in the preferred embodiment of the equipment of the invention, two such adjacent bonds are formed simultaneously and in spaced relation providing a cutting area 16 between each pair of sealed diapers. The area 16 may, depending upon conditions of materials and equipment, acquire some bond integrity but such is slight generally compared to the well sealed zones 15. Preferably, in the bonding of the scrim-reinforced tissue to the film 14 a polyethylene having a surface treatment to aid adhesion such as the well-known corona treatment is desirable particularly for sealing on a continuous basis at significant speed of diaper or other article production. A high melt index polyethylene having a softening point of about 325° F. is suitable as the film 14.

The diaper arrangement shown in FIGS. 1 and 2 is formed as illustrated particularly in FIG. 3. In FIG. 3 the water-pervious sheet 12 of a conventional scrim material is shown as carrying the film strip 14 on its under side. Additionally, the remainder of the diaper structure constituted by the backing film 11 and the absorbent pad 13 is shown as being directed in the same direction and below the sheet 12. The sheet 12 is directed over roll 21 and the edges of the sheet are presented to the nozzles 20 of hot melt adhesive extruders which provide adhesive to the under side edges of the sheet 12 as shown in FIG. 3. The rolls 22, 23 form a nip in which the traveling sheet 12 is presented to the moving underlying combination of backing sheet 11 and absorbent material 13 with the inturned portion 11a. The strips 11a are thus brought into contact in the nip between the rolls 22, 23 with the adhesive-carrying edges of the sheet 12 and become secured thereto forming the longitudinal seals of the diaper. As the diapers in continuous strip form exit from the rolls 22, 23 they move to sealing equipment generally designated at 24 over the guide and press roller 25 into contact with the peripheral surface of a drum 26 which rotates with hollow shaft 27. The diapers 10, of course, are more bulky in the absorbent filling 13 areas than at the ends where sealing is to be effected; the drum is arranged to receive the more bulky portions between heat sealing elements with the diapers' ends on the element, as will be noted more particularly hereinafter.

The numeral 28 designates an endless press belt which is trained over a plurality of guide and carrying rolls indicated at 25, 29, 30, 31, 32, 33, 34, 35, 40 and 41. The roll 31, in addition to its carrying function, provides a reverse bend to the belt, so that the diapers carried thereon following sealing (FIG. 3) tend to separate from the belt as the combination traverses the roll. The roll 34 is a takeup roll and reference will be made hereinafter to the equipment associated with it for this purpose,. The belt 28 is also suitably provided with an agent to assit quick release of the diapers from the belt surface. For this purpose a dip roll 36 rotates in a pond of water 37 retained in a tank 38, and the belt 28 is directed between the nip of liquid transfer roll 39 and backing roll 40. Water has been found to be a most suitable medium as the release agent when the belt is a smooth surfaced silicone rubber structure.

The takeup roll 34 tensions the belt 28 under the influence of air cylinders 42 disposed on opposite sides of the belt and supported by structural elements as at 43. The air cylinders are directed by guides 44 by means of cross head slides 45 moving vertically in the guides. Side frames 46 provide support for the elements 43 and 44 as well as for previously mentioned machine components. The belt 28 passes (FIG. 3) over a considerable length of the periphery of drum 26 and urges the strip of diapers into intimate contact with the drum and heater elements. Also, the belt moves with drum 26 and transports the diapers away from the heat sealing elements. The belt also maintains pressure on the heat seal zones for a length of time following fusion sufficient for the heat seals to become partially set. The liquid film carried on the belt surface appears to aid this action by providing some cooling, and it also provides a lubricating function so that the diapers withdrawn from the belt cleanly, leaving a surface ready for the receipt of additional increments of the diaper strip. The sealed strip is withdrawn from the belt and passes under roll 47 to conventional cutting equipment to provide the diapers as single units.

Figure 12:
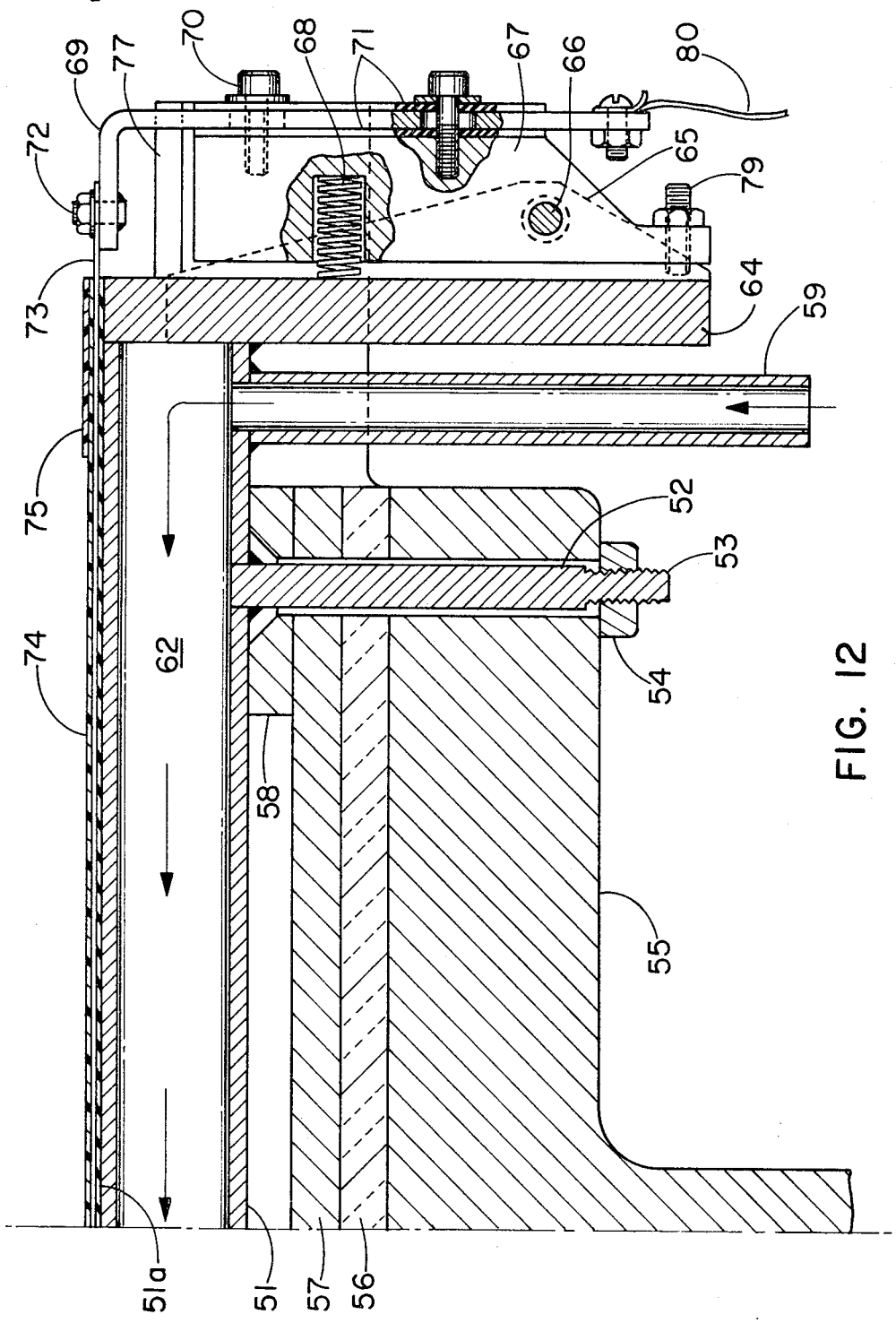
FIG. 12 is a much enlarged, transverse and fragmentary view partially in section of the structural arrangement of the heating components of the equipment of FIG. 3.
Figure 13:
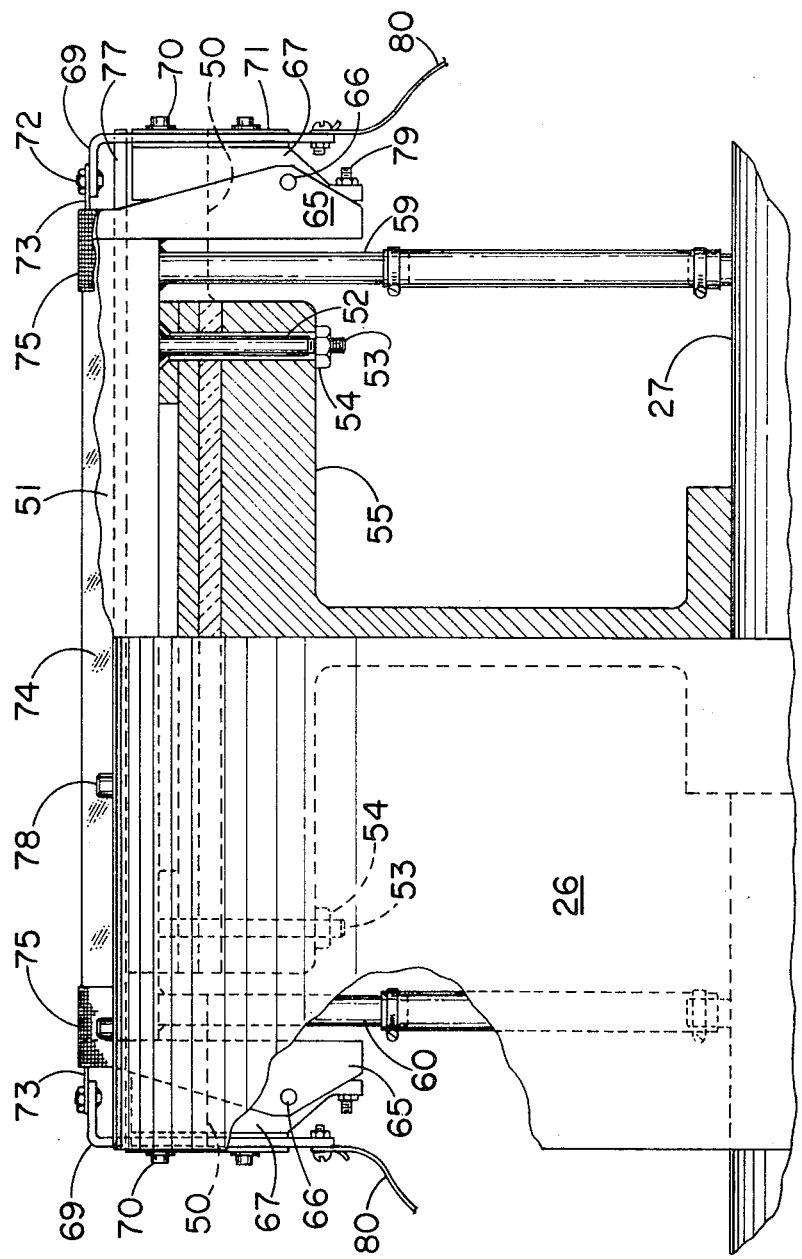
FIG. 13 is a view like that of FIG. 12 to a smaller scale but showing the heating components across the equipment width.
Figure 14:
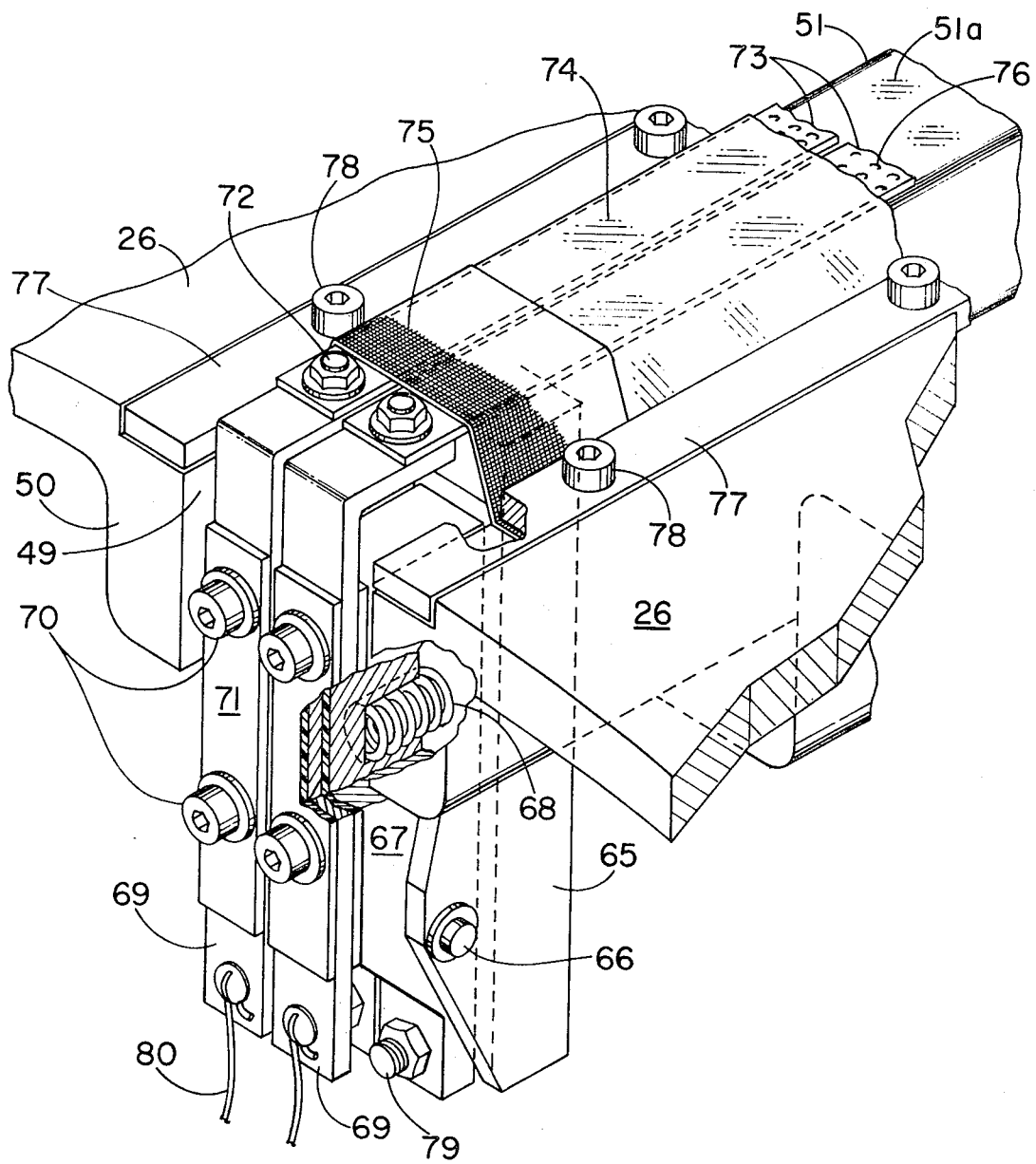
FIG. 14 is a fragmentary and perspective view with parts broken away and partially in section of the heating element arrangement similar to that shown in FIGS. 12 and 13.
Figure 15:
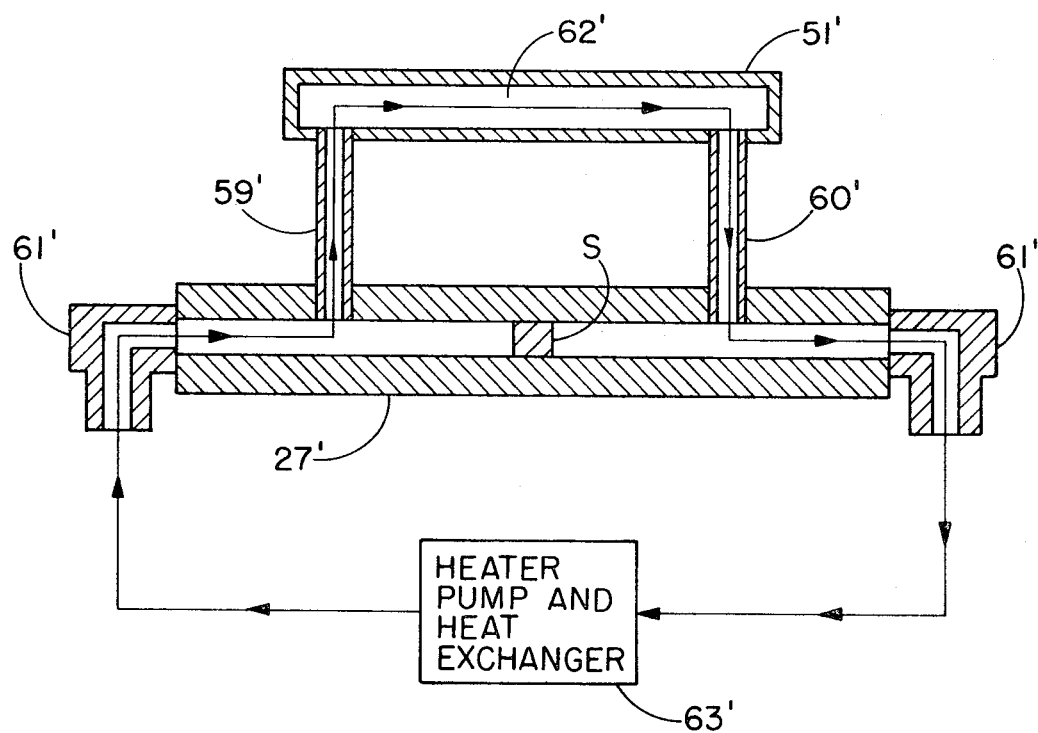
FIG. 15 schematically illustrates a means for providing heated fluid flow to the sealing equipment.

The structural arrangement of the heating equipment may be more clearly seen from FIGS. 3 and 11 through 15 inclusive. As shown in FIG. 3, the drum 26 is fixedly carried on and driven with shaft 27 which is itself driven by gear 48, the gear 48 being driven by conventional power means (not shown). The drum 26 is suitably a casting having a plurality of transversely extending recesses 49. The casting also has integral bosses 55 disposed at opposite ends of each recess 49 (FIG. 13). As indicated in FIGS. 12, 13 and 14, there is provided in each recess a hollow rectangular tubular member 51 which extends above the surface of drum 26 and is spaced peripherally from the sides of the recess.

Each tubular member 51 has secured to it at its opposite ends a downwardly depending rod 52. One member 51 is positioned in each recess 49 and rods 52 threaded at their ends 53 receive nuts 54 which serve to retain the rods and the tubular member 51 in fixed position with respect to a recess and bosses 55 of the casting. The numeral 56 (FIG. 12) designates a layer of insulating material and the numeral 57 indicates a spacer or shim maintained to provide for adequate mounting of the tubular member 51 so that it projects above the periphery of drum 26. A washer 58 is provided between the shim 57 and the tubular member 51 for the purpose of insuring a secure structural arrangement.

The tubular member 51 carries on its upper surface at 51a a thin layer of electrically insulating ceramic material which perimts good heat transmission. The electrical heating element 73 to be described more in detail hereinafter are supported by the member 51 on the coating 51a and are in heat transmissive but electrically insulated relation with the member 51.

The hollow tubular member 51 is a conduit for hot oil or other heating fluid and has a pipe 59 forming an oil inlet to the spacing 62. Numeral 60 designates the oil outlet from member 51. The arrangement for the supplying of heated oil to the equipment to maintain a constant temperature is more clearly indicated in FIG. 15 wherein the schematic illustration has parts numbered similar to those of FIGS. 12 and 13 but primed. Thus, the fitting 61' is provided to convey oil to the spacing 62' through the channel 59' in continuous recirculation through the channel 60' and the fitting 61'. The heater, pump and heat exchanger 63' are adapted in conventional fashion to furnish the flowing oil at a desired predetermined temperature, suitable to provide the materials to be sealed well above normal atmospheric temperatures and below sealing temperature. The block S or similar obstruction is provided (FIG. 14) for the purpose of separating the inlet from the outlet compartments and thus preventing short circuiting of the oil flow.

Referring now again to FIGS. 12 and 13, an end plate 64 sealing closes each end of the spacing 62 and each is itself welded to the rectangular tube member 51, the arrangement at one tube member end being shown clearly in FIG. 12. Each plate 64 carries a pair of ears 65 (FIG. 14). A pivot shaft 66 extends through each ear 65 and an accompanying pivot block 67. A spring 68 is carried by each pivot block and one end of it abuts an end plate 64 (FIG. 12) while the other end is received within the block. Accordingly, each spring 68 functions to bias a block 67 away from a plate 64 by rotational movement on a pivot shaft 66. Each block 67 is also provided with an L-shaped bracket 69 which is retained on a block 67 by a washer and nut retainer combination indicated at 70, the screw passing through bracket 69 in spaced relation (FIG. 12). The shorter arm of the L-shaped bracket 69 carries a threaded bolt and screw 72 which retain one end of heating element 73 in association with the bracket. Accordingly, when a block 67 is urged by the spring 68 away from the plate 64, the strip heating element 73 will be provided in tension and wrinkling of the element or other physical distortion is avoided. Each heating element 73 has a tensioning arrangement at each end of the element.

The arm 69 is electrically conductive. Interposed between the block 67 and the arm 69 and also between the arm 69 and the retaining elements 70 are electrical insulating panels 71 to prevent short circuiting of the current flow through the arm 69 by the block 67 or by elements 70.

The heating element 73 is of a known commercially available material having a high electrical resistance such as the nickel-chromium alloy Nichrome. It is provided with a thin electrical insulating covering 74 of synthetic resin (Teflon, a registered trademark of Du Pont) fibers and, to protect against frayed ends, fiberglass insulation is provided as shown at 75 in FIG. 12. As may be more clearly seen from FIG. 14, the heating elements are themselves provided with dimples 76 which project from the plane of the elements and locally exert an excess of pressure on material carired on the electrically insulated strips being subjected to heating transfer, thus providing for excellent heat transmission in the dimpled areas. Thus, when materials to be bonded are supported on the electrically insulated strips, heat resulting from electrical impulses to the strips will be transmitted practically instantaneously to the materials.

As shown also in FIG. 14, clamp bar strips 77 are provided on each peripheral side of the recess 49 in the drum 26 and bear against the underlying electrical insulation material 74, 75 to retain such well fixed. The clamp bar strips are themselves retained by cap screws at 78 located below the upper surface of member 51 and positioned so that they do not interfere with the strip of diapers carried by the drum.

Referring again to FIGS. 12 and 13, means are provided to limit the tension applied to the electrically energizable heating strips 73. Thus, a screw designated at 79 is carried by each block 67 and serves as a stop member by abutment with a plate 64, thus inhibiting injury to the elements by application of excess tension and keeping the heating strips symmetrically disposed about the centerline by limiting movement of blocks 67 at each end.

The heat for sealing is provided, as already noted, by a combination of a constant temperature condition achieved by flow of heating fluid through tubular member 51 and impulse heating provided by heat sealing impulses of electrical current through a heating element or strip 73 supported in heat conductive relation by the tubular member. This combination of heating means and associated structure previously described are conveniently designated in FIGS. 3 through 9 of the drawings by the letter "H." In the specific embodiment shown (FIG. 3), six heating-sealing stations are included and designated H-1 through H-6. Their location in FIG. 3 corresponds to that in the schematic view in FIG. 5. A plurality of commutator segments designated by the numeral C are provided by a rotating commutator, and six such segments C-1 through C-6 are shown in FIGS. 4-9 inclusive. These segments are separated by insulating spacers. Additionally, signal means in the form of flags "F" are provided and carried on the periphery of the mechanical power transmission component gear 48. The flags are designated F-1 through F-6 and each flag is associated with a commutator segment and in fixed relation a heater H. As illustrated in FIG. 3 and shown schematically in FIGS. 4 through 9, flag F-1, for example, in rotation with gear 48 leads commutator segment C-1. Further, flag F-1 rotates with H-1, F-2 rotates with H-2 and so on. For convenience in the schematic representations (FIG. 5) the paths of rotation are indicated by the letters C, H and F. Also, in FIGS. 4 through 9, the fixedly positioned brushes B, three in number, are designated individually as B-1, B-2 and B-3, and their relation to the commutator segments is shown. The brushes are connected in parallel, and power is turned off during the periods just before and just after the insulating spacers between commutator segments contact the brushes so that sparking is inhibited.

The power source and control for the application of power to the electric heating elements 73 are shown in FIG. 10. In the FIG. 10 showing the strip heaters of H-1 through H-6, the commutator segments C-1 through C-6 and the brushes B-1 through B-3 are clearly designated in their electrical circuit arrangement. Additionally, gear 48 and one flag F are shown with the flag, in its rotation with the gear, positioned to intercept the light beam directed between the photoelectric eye components 82a, 82b. A fast acting relay 83 is controlled by the position of flags F relative to the photoelectric eye system and, in the present instance, the relay is closed when the light beam is uninterrupted. Relay 83 controls the application of electrical power to the brushes B-1 through B-3 as indicated. The power is obtained from a conventional power amplifier indicated in block diagram form at 86 and which is itself supplied from the usual power line as illustrated. Basically, the thyristor power supply has an output proportional to the output of the tachometer driven by the lineshaft and a setting of the amplifier's internal gain control. The amplifier is a commercially available Payne amplifier consisting of two silicon controlled rectifiers connected back to back. The tachometer-generator 84 is conventional equipment and, in the specific embodiment of the equipment disclosed, the tachometer is driven by the line shaft (not shown) of the apparatus and the generator output is amplified and fed to the Payne power amplifier. Thus, as the main shaft of the equipment runs at an increasing speed, a greater current is sent to the power amplifier and this, in turn, provides greater current to the heating elements 73 at the appropriate intervals. The control of the current flow from the power amplifier may be affected by means of potentiometer 85, and this, in turn, will alter the heating current in elements 73 so that a proper heating condition may be readily attained for specific materials. Generally with the polyethylene materials of high melt index, such as is particularly suitable for the film 14, an oil temperature of about 200° F. to 215° F. with provision to supply sufficient heating electrically to raise the temperature to above 325° is quite sufficient.

In the operation of the device the diapers 10 are fed in strip form as shown in FIG. 3 to the endless carrier or drum 26 with the portions to be sealed lying across the raised electrically insulated heaters H and the more bulky portions registering between the heaters on the drum periphery. The hot oil flowing at a temperature of about 200°–215° F. (for the materials of the diaper as previously described) heats the elements 73 as well as pre-heating the areas of the diapers to be sealed. Belt 28 having a heat resistant silicone surface engages the thermoplastic polyethylene backing 11 and presses the diapers to the heaters.

As shown in FIGS. 4–9 inclusive, electric heating current is applied to each of three heating elements 73 simultaneously, and each is pulsed three times in one revolution of the endless carrier or drum 26. Thus, each area to be sealed in the specific equipment operation described is pulsed three times. Such arrangement permits a somewhat lesser current value to be employed than were only a one pulse operation employed. Also, it permits of better sealing than if a single pulse operation of the same current value were employed.

Figure 4:
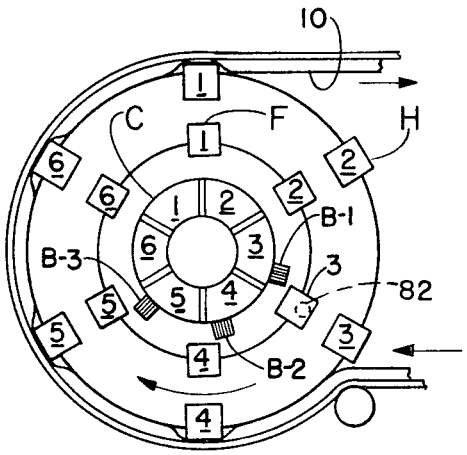
FIGS. 4 through 9 illustrate schematically a sequence of operations effected by the equipment embodiment of FIG. 3 to procure the diaper seal arrangements of FIGS. 1 and 2.
Figure 5:
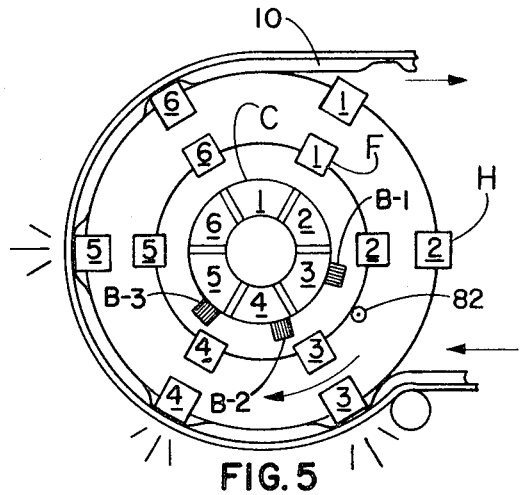
Figure 6:
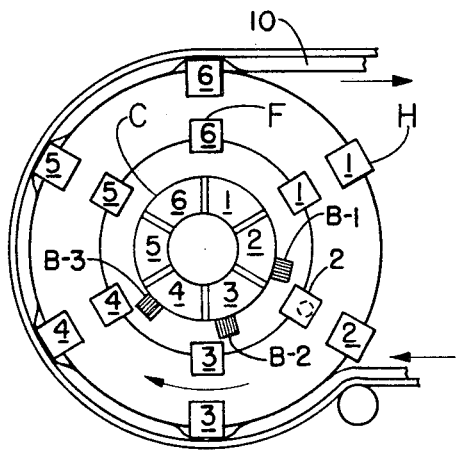
Figure 7:
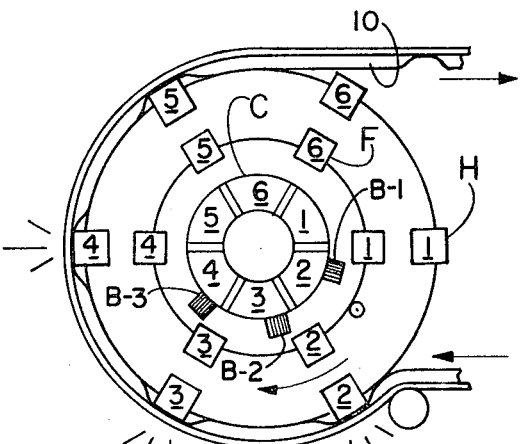
Figure 8:
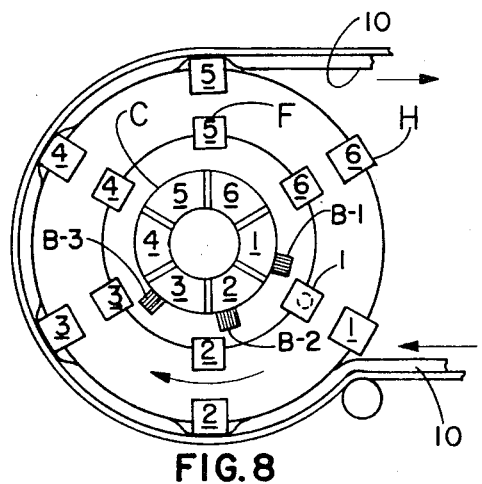
Figure 9:
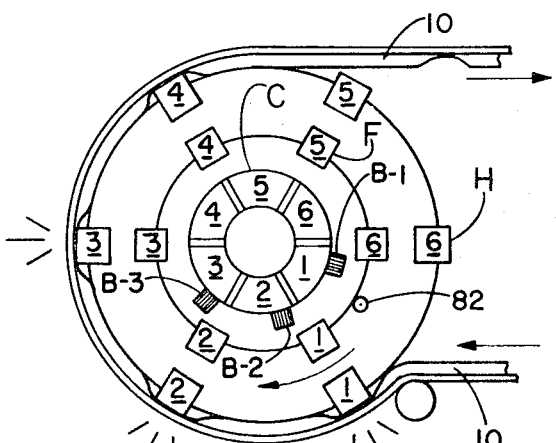

Referring more specifically to the schematic illustration of FIG. 4, a heater, such as H-3, in the rotation of drum 26, is contacted by the incoming strip of diapers 10 and the flag F-3 associated with H-3 will interrupt the light between the photoelectric components 82a, 82b. This interruption is indicated in FIG. 4 by the position of the small block on the F circular path over the representation of the eye as designated at 82. Due to the interruption, the relay 83 is open and no current flows to the brushes "B." As the drum carries the heater H-3 in its path, the gear 48 carries the flag F-3 onward and the light beam is uninterrupted, permitting electric current flow to brushes B-1 through B-3 arranged in parallel (FIG. 10). At this time (FIG. 5) commutator segments C-3, C-4, C-5 will be in contact with the fixed brushes permitting current flow to heaters H-3, H-4 and H-5. Such current will flow for about 60° of movement of the drum 26 when flag F-2 (FIG. 6) will interrupt the light source, cutting off power flow to the heaters in the manner already described. As F-2 clears the light beam, current will flow to energize heaters H-2, H-3 and H-4 (FIG. 7). Heater H-5 will at this time have cleared the portion of the path to which heat is applied and will be covered by the action of the belt carrying the water film and the oil itself which, while hot, is at a considerably lesser temperature than that at which heat-sealing is effected. Normally for the components mentioned, such heat-sealing temperature will be in the range of 325°–350° F. It will now be apparent that, as flag F-1 traverses the light beam, power to the heating elements will again be interrupted and then reapplied as H-1 (FIG. 9) carries a diaper 10 to the entrance to the drum.

As FIG. 11 indicates and FIGS. 1 and 2 clearly show, two seals in spaced apart relation are formed simultaneously. The belt 28 carries the sealed material first on the drum under pressure and then from the drum on the under side of the belt to the reverse bend at roll 31. The travel of the heat sealed products away from the drum, the effect of the release agent 37 carried by the belt and the mechanical action of the reverse bend all contribute to separation of the products from the belt cleanly. This is an important factor in continuous operation which would be adversely affected by any accumulation of surface materials on the belt. The thermoplastic which contacts the belt does tend to adhere for the temperature condition of the belt surface apparently approaches 200° F. when the hot oil is above 200° F. and this tends to provide a tackiness in the thermoplastic backing of the specific product described.

In practice, the size of the carrier or drum, the spacing of heaters the extent to which the heater projects above the surface of the carrier, the speed of sealing and the like may, of course, be chosen to accommodate the particular product to be sealed. In the specific application of diaper sealing, the diaper blanks may be of various sizes. One preferred size is 12½ inches by 17½ inches. With such diaper blanks disposed in end-to-end relation in strip form at about 30 diapers per minutes, the speed of the carrier is approximately 525 inches per minute. When accelerated to 200 diapers per minute, the speed is approximately 5500 inches per minute. The electrical current supplied to the electrically conductive heating element is, of course, dependent upon sealing conditions including the materials; at a pre-heat temperature of about 200–215° F. with the diapers described, about 50 amps appears suitable in lower speed ranges and about 75 amps in the range of 200 diapers per minute. It is understood that these data are illustrative only and may vary widely in the utilization of the principles of the invention.

Importantly, the products do not suffer any significant degradation of the polyethylene or filler materials and burning of the components is completely avoided by appropriate selection of materials and operating conditions.

As many apparently widely different embodiments of this invention may be made without departing from the spirit and scope thereof, it is to be understood that I do not limit myself to the specific embodiments thereof except as defined in the appended claims.

What is claimed is:

1. In a machine of the thermal impulse type for the heat sealing of superposed materials at least one of which is thermoplastic, in combination, an endless carrier, a plurality of heat sealing mechanisms spaced around the carrier projecting from the periphery of the carrier and extending transversely of the carrier, means to press materials to be heat sealed into contact with the heat sealing mechanisms, each said heat sealing mechanisms including an electrically conductive heating element through which sealing pulses of electric current may be passed and a tubular member supporting each said element in electrically insulated but heat transmissive relation, means to pass a heated fluid of predetermined temperature through each tubular member to maintain the heating element supported by it at an elevated temperature but below that of the softening point of thermoplastic material to be sealed, means to periodically energize the heat sealing elements to heat sealing temperature in response to the position in the machine of the materials to be sealed, and means to move the heating sealing mechanisms into contact with said press means prior to energizing the heat sealing elements and away from said press means when the sealed materials have consolidated.

2. In a machine of the thermal impulse type as claimed in claim 1 and in which means are provided to sense the speed of the heat sealing mechanisms, the combination with the means to periodically energize the heat sealing elements of means to control the level of the energizing electric current in proportion to machine speed whereby at increasing machine speeds an increasing energizing electrical current is applied to each heat sealing element.

3. Heat sealing apparatus comprising means to heat layers of material including a thermoplastic material to be sealed, means to press the layers of material together as they are heated, mechanical power component means to move the said heat means and press means in unison, signal flag means carried by the power component means, said signal flag means being carried in fixed relation to said heat means, a light sensitive photoelectric cell device arranged to be controlled by light rays which are positioned to be interrupted by said signal flag means, electric circuit means including a source of electric power for supplying heater sealing current to said heat means and responsive to the position of said flag means relative to said light rays, and means to maintain said heat means at an elevated predetermined temperature but below the softening point of the thermoplastic material to be sealed, whereby the position of the said signal flag means determines the application of heat sealing current to the material to be sealed.

4. Heat sealing apparatus as claimed in claim 3 in which the said electric circuit means includes an electric relay for controlling the application of electric power to the heat means and said flag means as it moves relative to the light rays of the photoelectric cell device controls the actuation of the said relay.

5. A machine for heat sealing materials having a thermoplastic component comprising a drum carrier, means for passing the materials to be heat sealed in superposed relation to the carrier, a plurality of heat sealing devices mounted on the carrier in spaced relation and projecting above the carrier surface, said heat sealing devices each including: an elongated heating strip heated, adapted to be heated to heat sealing temperature by the passage of electric current therethrough and a tubular member supporting each strip heater and adapted to have a heating fluid passed therethrough, means to provide a heating fluid to each said tubular member at a temperature below heat sealing temperature but well above the temperature of the tubular member in the unheated condition of such member, means for pressing the material to be sealed against each heat sealing device, said means including a belt wrapping a portion of the drum periphery, means to periodically energize each elongated heating strip to heat sealing temperature in response to the position in the apparatus of the materials to be sealed, means to direct the said belt away from the elongated heater strips following heat sealing, and means to provide the belt with a release agent prior to engagement of the belt with material to be heat sealed.

6. In a machine for heat sealing the ends of diapers from a traveling series of connected diapers having a bulky absorbent core between opposed diaper ends of heat sealable materials which are fusible together to form transverse heat seals on said diapers, the improvement which comprises first means for carrying the series of connected diapers from an input to an output of the machine, said first means including an endless carrier, a plurality of heat sealing mechanisms on said carrier each including a tubular member adapted to have heated fluid passed therethrough and a pair of electrically energizable heating elements in heat transmissive but electrically insulated relation lying in parallel, separated disposition on said tubular member, said heat sealing mechanisms being spaced apart on said endless carrier a distance such as to receive therebetween a bulky absorbent core of a diaper with each diaper end lying across a said heat sealing mechanism, an endless belt wrapping a portion of the periphery of the said endless carrier and arranged to press said diapers to said carrier and heat sealing mechanisms, a pond of a release agent through which said belt passes prior to engagement with diapers proceeding from the machine input to the machine output, means including a length of travel of the endless belt following belt contact with the carrier to cool heat sealed diaper ends, means to heat the electrically energizable heating elements to heat sealing temperature, means to pass heated fluid through said tubular member to raise the temperature of said electrically energizable heating elements thereon toward the heat sealing temperature, and means to control the level of heat sealing current appplied to said heating elements in accordance with the speed of the diapers traveling in series from the machine input to the machine output.

7. In a machine as claimed in claim 6, means to initiate and terminate the electric heating currents to heating elements in relation to diaper position on the carrier in the travel of the diapers through the machine.

8. In a machine as claimed in claim 7, means to initiate and terminate the heating electric current to a single electric heating element a plurality of times in the travel of one diaper on the carrier.

9. Mechanism as claimed in claim 8 and in which the electric heater element has a dimpled surface.

References Cited

UNITED STATES PATENTS

| 3,026,233 | 3/1962 | Scholl et al. | 156—251 |
| 3,122,466 | 2/1964 | Shabram | 156—583 |
| 3,399,291 | 8/1968 | Limbach | 156—583 |

DOUGLAS J. DRUMMOND, Primary Examiner

U.S. Cl. X.R.

156—583